United States Patent
Garcia et al.

(10) Patent No.: US 12,386,641 B2
(45) Date of Patent: Aug. 12, 2025

(54) VIRTUAL ASSISTANT FOR FACILITATING ACTIONS IN OMNICHANNEL TELECOMMUNICATIONS ENVIRONMENT

(71) Applicant: T-Mobile USA, Inc., Bellevue, WA (US)

(72) Inventors: Nestor Garcia, Atlanta, GA (US); Kristian D. Taylor, Chester, VA (US); Ramesh Vemula, Olathe, KS (US); Qianwen Wen, Herndon, VA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 18/309,735

(22) Filed: Apr. 28, 2023

(65) Prior Publication Data

US 2024/0362044 A1 Oct. 31, 2024

(51) Int. Cl.
*G06F 9/451* (2018.01)
*H04L 67/10* (2022.01)

(52) U.S. Cl.
CPC ............ *G06F 9/453* (2018.02); *H04L 67/10* (2013.01)

(58) Field of Classification Search
CPC ................................ G06F 9/453; H04L 67/10
See application file for complete search history.

(56) References Cited

U.S. PATENT DOCUMENTS

| | | |
|---|---|---|
| 5,978,672 A | 11/1999 | Hartmaier et al. |
| 6,181,935 B1 | 1/2001 | Gossman et al. |
| 6,452,915 B1 | 9/2002 | Jorgensen |
| 6,865,261 B1 | 3/2005 | Rao et al. |
| 6,879,677 B2 | 4/2005 | Trandal et al. |
| 6,912,230 B1 | 6/2005 | Salkini et al. |
| 6,952,181 B2 | 10/2005 | Karr et al. |
| 6,963,638 B1 | 11/2005 | Keller |
| 7,239,689 B2 | 7/2007 | Diomelli |
| 7,356,345 B2 | 4/2008 | Cunningham et al. |
| 7,433,350 B2 | 10/2008 | Aboujaoude et al. |
| 7,519,362 B2 | 4/2009 | Laperch |

(Continued)

FOREIGN PATENT DOCUMENTS

| | | |
|---|---|---|
| CN | 1658634 B | 6/2010 |
| CN | 102238018 A | 11/2011 |

(Continued)

*Primary Examiner* — Asher D Kells
(74) *Attorney, Agent, or Firm* — Perkins Coie LLP

(57) ABSTRACT

Introduced here is a computer-implemented virtual assistant used for completing tasks in an omnichannel environment. The virtual assistant is a common entry point for task completion at an electronic device in a network and can be operable based on a model trained on user activity and network activity. The virtual assistant can receive a request to perform a task associated the electronic device. The virtual assistant can facilitate performance of a first action via a first channel of the network in furtherance of completing the task. Upon detecting performance of the first action, the virtual assistant can present instructions to perform a second action via a second channel (different from the first channel) in furtherance of completing the task. The virtual assistant can detect performance of the second action and present an indication of the completion of the task at the electronic device.

20 Claims, 4 Drawing Sheets

(56) References Cited

U.S. PATENT DOCUMENTS

| | | | |
|---|---|---|---|
| 7,653,186 B2 | 1/2010 | Hosain et al. |
| 7,676,221 B2 | 3/2010 | Roundtree et al. |
| 7,809,376 B2 | 10/2010 | Letourneau et al. |
| 8,073,440 B2 | 12/2011 | Quimby et al. |
| 8,140,389 B2 | 3/2012 | Altberg et al. |
| 8,165,572 B1 | 4/2012 | Kirchhoff et al. |
| 8,189,549 B2 | 5/2012 | Caldwell et al. |
| 8,239,286 B2 | 8/2012 | Davis et al. |
| 8,275,110 B2 | 9/2012 | Vendrow |
| 8,374,577 B2 | 2/2013 | Jonsson |
| 8,380,858 B2 | 2/2013 | Froelich |
| 8,457,661 B2 | 6/2013 | Rossano et al. |
| 8,611,850 B1 | 12/2013 | Gailloux et al. |
| 8,660,911 B2 | 2/2014 | Hirson et al. |
| 8,725,129 B2 | 5/2014 | Poltorak |
| 8,996,588 B2 | 3/2015 | Ko et al. |
| 9,124,694 B2 | 9/2015 | Monegan et al. |
| 9,363,008 B2 | 6/2016 | Boss et al. |
| 9,408,056 B2 | 8/2016 | Rotem |
| 9,516,491 B2 | 12/2016 | Lihosit et al. |
| 9,591,482 B1 | 3/2017 | Finnerty et al. |
| 9,609,510 B2 | 3/2017 | Raleigh et al. |
| 9,665,865 B1 | 5/2017 | Xing et al. |
| 9,712,576 B1 | 7/2017 | Gill |
| 9,715,835 B2 | 7/2017 | Mason et al. |
| 9,740,999 B2 | 8/2017 | Rivere |
| 9,823,813 B2 | 11/2017 | Beechuk et al. |
| 9,830,589 B2 | 11/2017 | Xing |
| 9,838,888 B2 | 12/2017 | Lihosit et al. |
| 9,852,391 B2 | 12/2017 | Al Rifai |
| 9,865,099 B2 | 1/2018 | Jayanthi et al. |
| 9,953,308 B2 | 4/2018 | Xing |
| 10,055,681 B2* | 8/2018 | Brown .................... G06N 3/008 |
| 10,140,641 B2 | 11/2018 | Smith et al. |
| 10,242,343 B2 | 3/2019 | Bylahalli et al. |
| 10,292,055 B2 | 5/2019 | Carpenter et al. |
| 10,572,467 B2 | 2/2020 | Beechuk et al. |
| 11,184,479 B2 | 11/2021 | Singh et al. |
| 11,257,494 B1* | 2/2022 | Zhong .................... G06N 20/00 |
| 11,297,513 B2 | 4/2022 | Agarwal et al. |
| 11,388,567 B1 | 7/2022 | Mccracken et al. |
| 2001/0037264 A1 | 11/2001 | Husemann et al. |
| 2002/0046299 A1 | 4/2002 | Lefeber et al. |
| 2003/0073412 A1 | 4/2003 | Meade |
| 2004/0125937 A1 | 7/2004 | Turcan et al. |
| 2006/0168259 A1 | 7/2006 | Spilotro et al. |
| 2007/0047523 A1 | 3/2007 | Jiang |
| 2007/0060306 A1 | 3/2007 | Amaitis et al. |
| 2007/0265006 A1 | 11/2007 | Washok et al. |
| 2007/0271234 A1 | 11/2007 | Ravikiran |
| 2008/0160956 A1 | 7/2008 | Jackson et al. |
| 2008/0183852 A1 | 7/2008 | Pramer et al. |
| 2008/0233924 A1 | 9/2008 | Baird et al. |
| 2009/0167553 A1 | 7/2009 | Hong et al. |
| 2009/0209239 A1 | 8/2009 | Montesdeoca |
| 2009/0276298 A1 | 11/2009 | Tsai |
| 2009/0328118 A1 | 12/2009 | Ravishankar et al. |
| 2010/0026816 A1 | 2/2010 | Bergstrom et al. |
| 2010/0093396 A1 | 4/2010 | Roundtree |
| 2010/0122334 A1 | 5/2010 | Stanzione et al. |
| 2010/0216396 A1 | 8/2010 | Fernandez et al. |
| 2010/0228776 A1 | 9/2010 | Melkote et al. |
| 2011/0034176 A1 | 2/2011 | Lord et al. |
| 2011/0141218 A1 | 6/2011 | Stancato |
| 2012/0209729 A1 | 8/2012 | Lovegreen |
| 2013/0073388 A1 | 3/2013 | Heath |
| 2013/0268357 A1 | 10/2013 | Heath |
| 2013/0312008 A1 | 11/2013 | Park et al. |
| 2014/0316869 A1 | 10/2014 | Oneill et al. |
| 2015/0127628 A1 | 5/2015 | Rathod |
| 2017/0103440 A1 | 4/2017 | Xing et al. |
| 2018/0239582 A1 | 8/2018 | Goss |
| 2018/0253700 A1 | 9/2018 | Coquillette et al. |
| 2019/0392491 A1 | 12/2019 | Niemann |
| 2022/0272084 A1 | 8/2022 | Hyatt |
| 2023/0186033 A1* | 6/2023 | Rastogi .................... G06F 3/167 704/9 |
| 2024/0036893 A1* | 2/2024 | Beaver .................... G06F 40/35 |

FOREIGN PATENT DOCUMENTS

| | | |
|---|---|---|
| CN | 104836890 A | 8/2015 |
| CN | 103268655 B | 11/2015 |
| CN | 102938895 B | 1/2016 |
| CN | 107113303 A | 8/2017 |
| CN | 108986876 A | 12/2018 |
| CN | 107113294 B | 7/2021 |
| DE | 10247622 A1 | 7/2003 |
| EP | 1150262 A2 | 10/2001 |
| EP | 1197040 A1 | 4/2002 |
| EP | 1252754 A1 | 10/2002 |
| EP | 1329833 A2 | 7/2003 |
| EP | 1654712 A1 | 5/2006 |
| EP | 1889428 A2 | 2/2008 |
| EP | 1912713 A2 | 4/2008 |
| EP | 2132922 A2 | 12/2009 |
| EP | 2396755 A1 | 12/2011 |
| JP | 2014514804 A | 6/2014 |
| KR | 100294360 B1 | 7/2001 |
| KR | 20060060521 A | 6/2006 |
| KR | 100779174 B1 | 11/2007 |
| KR | 20110057279 A | 6/2011 |
| KR | 101471538 B1 | 12/2014 |
| WO | 0175555 A2 | 10/2001 |
| WO | 2006005122 A1 | 1/2006 |
| WO | 2008065215 A1 | 6/2008 |
| WO | 2011113121 A1 | 9/2011 |
| WO | 2011130871 A1 | 10/2011 |
| WO | 2012003842 A1 | 1/2012 |
| WO | 2012019317 A1 | 2/2012 |
| WO | 2018122709 A1 | 7/2018 |
| WO | 2018207057 A1 | 11/2018 |
| WO | 2020148658 A2 | 7/2020 |
| WO | 2021046168 A1 | 3/2021 |

* cited by examiner

VIRTUAL ASSISTANT FOR FACILITATING ACTIONS IN OMNICHANNEL TELECOMMUNICATIONS ENVIRONMENT

BACKGROUND

Mobile phones have become ubiquitous as basic communications tools. They are not only used for calls but also to access the Internet, send text messages, and capture images. Telecommunications carriers offer flexible options to make mobile phones broadly available to customers. In addition to paying full price or buying a lower-cost, subsidized mobile phone in exchange for signing a multi-year contract, customers can subscribe to pay-to-own equipment installment plans (EIP) along with leasing options.

A customer can use her mobile phone to complete various tasks. For example, a customer may interact with a user interface to begin a process to resell an existing phone and upgrade to a newer mobile phone. Though the customer began the process at the user interface, she may need to interact with a company website to determine that she needs to call an external operator. The external operator can offer her an upgrade price, which she then takes to a retail location to shop for the newer mobile phone. She may need to call the operator again to confirm that her data can be transferred from the existing phone to the newer mobile phone. To complete the process, she may also need to revisit the retail location and/or call the external operator, sometimes multiple times. Determining which of these channels the customer needs to interact with and in what order is time-intensive and demanding for customers. Hence, a need exists to access a reliable, objective, and accurate way to guide a customer through completion of various tasks.

BRIEF DESCRIPTION OF THE DRAWINGS

Detailed descriptions of implementations of the present invention will be described and explained through the use of the accompanying drawings.

Figure 1:
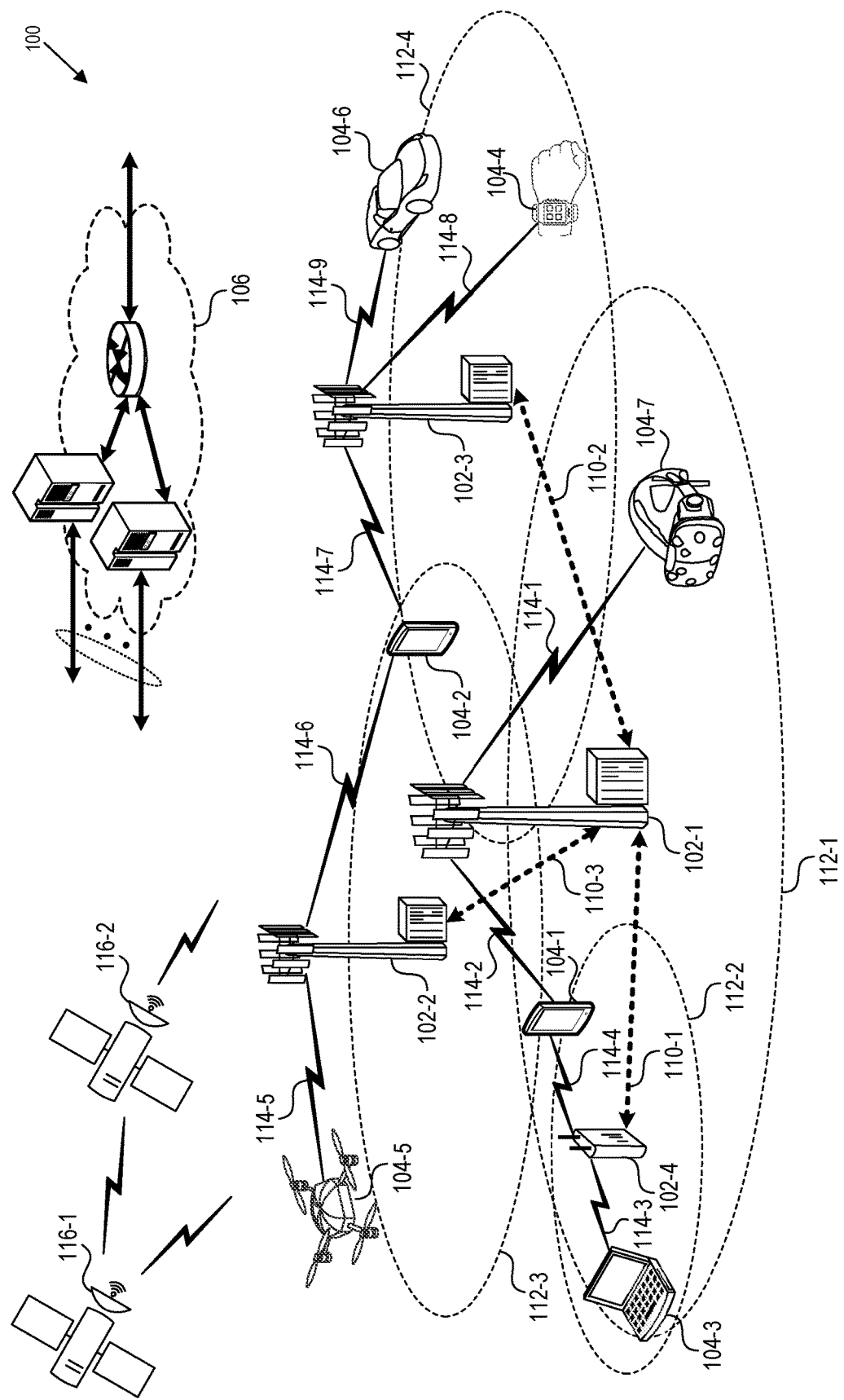
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed systems and methods enable performance of a reliable, objective, and trustworthy virtual assistant that performs tasks for an electronic device in an omnichannel environment. For example, the virtual assistant can receive a request to perform a task for an electronic device in a telecommunications network. The virtual assistant is built to handle tasks for the particular user of the electronic device. For example, the virtual assistant can handle the task based on the user's activity at the electronic device, such as interactions entered by the user at the electronic device or locations the user has taken the electronic device to.

The virtual assistant can complete the task by taking multiple actions that use different channels of the telecommunications network. For instance, the virtual assistant may interact with a website to complete one action and may remotely interact with a kiosk at a store associated with the telecommunications network to complete another action. The virtual assistant may also create instructions for the user to take to complete an action and present the instructions at the electronic device. For example, the virtual assistant can generate instructions for the user to go to a store associated with the telecommunications network and interact with a particular external operator. Once all actions associated with the task have been completed, the virtual assistant can present an indication that the task was done at the electronic device.

The virtual assistant can employ machine-learned models each trained to determine actions for task completion for a particular user. For instance, each machine-learned model may be trained on training data including user activity and network activity associated with a particular user. This training data can be captured at the electronic device or at a set of electronic devices associated with the particular user. The machine-learned model can be periodically retrained on new training data of the user activity and network activity of the particular user. For example, if the particular user upgrades her phone, the machine-learned model can be retrained on new data received at her new phone.

By using a virtual assistant in this manner, the challenges of completing tasks in an omnichannel environment are mitigated. That is, the disclosed embodiments use the virtual assistant to facilitate actions that require interactions with multiple channels (e.g., web pages, physical locations, telecommunications) in a telecommunications environment to be completed. The disclosed technology can be used to facilitate task completion for any Internet-of-Things (IoT) devices or any other electronic devices where actions can be completed via multiple channels in an environment.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a network server computer, mobile device, or personal computer (PC). Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players, and the like. Indeed, the terms "computer," "server," and the like are generally used interchangeably herein and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a local area network (LAN), wide area network (WAN), a wireless telecommunications network, or the Internet. In a distributed computing environment, program modules can be located in both local and remote memory storage devices.

Aspects of the invention can be stored or distributed on tangible computer-readable media, including magnetically or optically readable computer disks, hardwired or preprogrammed chips (e.g., EEPROM semiconductor chips), nanotechnology memory, biological memory, or other data storage media. In some embodiments, computer-implemented instructions, data structures, screen displays, and other data under aspects of the invention can be distributed over the Internet or over other networks (including wireless networks), on a propagated signal on a propagation medium (e.g., an electromagnetic wave(s), a sound wave) over a period of time, or they can be provided on any analog or digital network (packet-switched, circuit-switched, or other scheme). The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (BSC) (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., IoT, mobile broadband (MBB), vehicle-to-everything (V2X), machine-to-machine (M2M), machine-to-everything (M2X), ultra-reliable low-latency communication (URLLC), machine-type communication (MTC)).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The DL transmissions can also be called forward link transmissions while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high-quality service requirements and multi-terabits per second data transmission in the 6G and beyond era, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

System Overview

Figure 2:
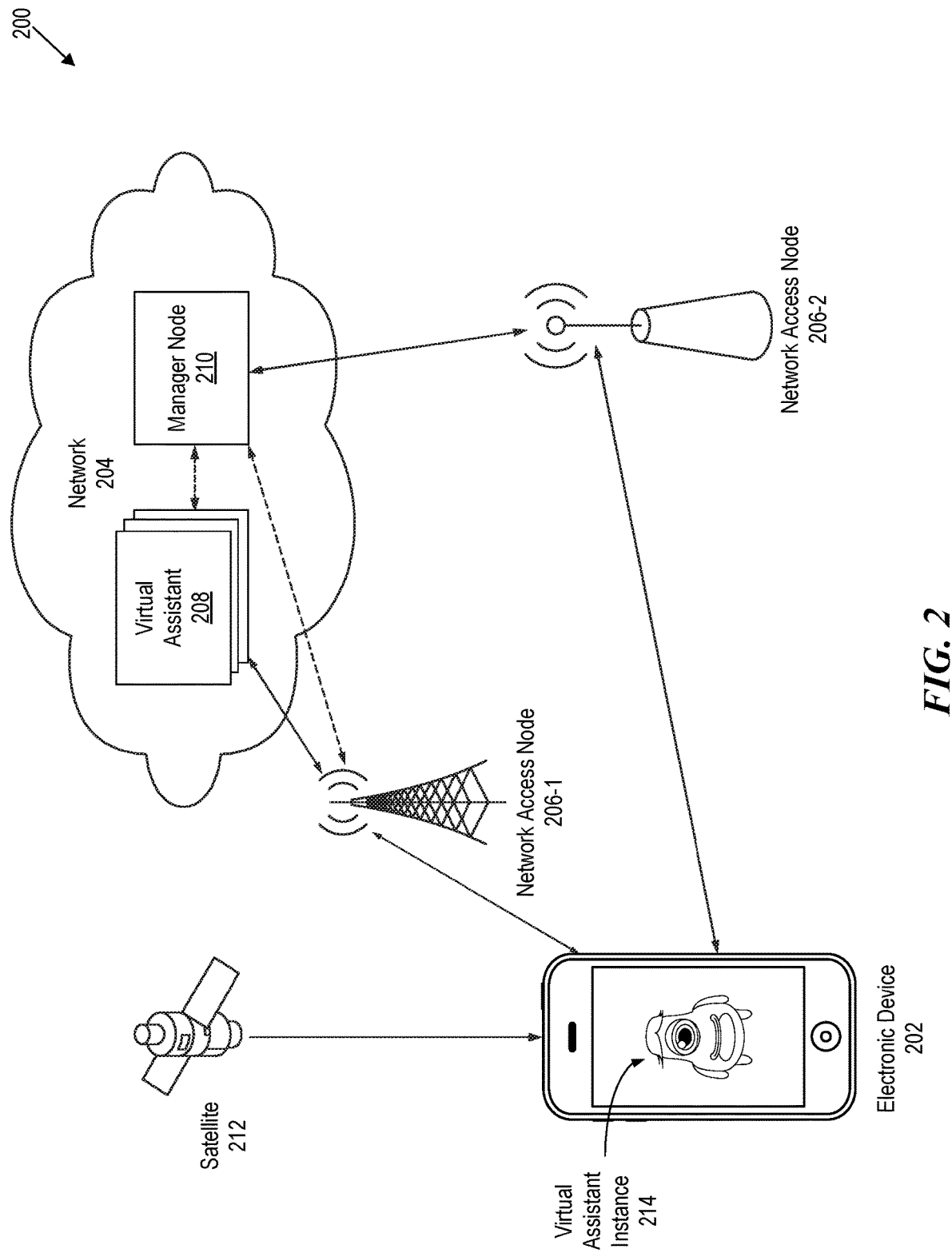
FIG. 2 is a block diagram that illustrates a system that completes tasks using a virtual assistant.

FIG. 2 is a block diagram that illustrates a system that completes tasks using a virtual assistant. The system 200 includes an electronic device 202 that is communicatively coupled to one or more networks 204 via network access nodes 206-1 and 206-2 (referred to collectively as "network access nodes 206" or individually as "network access node 206").

The electronic device 202 is any type of electronic device that can communicate wirelessly with a network node and/or with another electronic device in a cellular, computer, and/or mobile communications system. Examples of the electronic device 202 include smartphones (e.g., APPLE IPHONE, SAMSUNG GALAXY), tablet computers (e.g., APPLE IPAD, SAMSUNG NOTE, AMAZON FIRE, MICROSOFT SURFACE), wireless devices capable of M2M communication, wearable electronic devices, movable IoT devices, and any other handheld device that is capable of accessing the network(s) 204. Although only one electronic device 202 is illustrated in FIG. 2, the disclosed embodiments can include any number of electronic devices.

The electronic device 202 can store and transmit (e.g., internally and/or with other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

The electronic device 202 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on a processor(s) of that electronic device. One or more parts of an embodiment of the present disclosure can be implemented using different combinations of software, firmware, and/or hardware.

The network access nodes 206 can be any type of radio network node that can communicate with a wireless device (e.g., electronic device 202) and/or with another network node. The network access nodes 206 can be a network device or apparatus. Examples of network access nodes (NANs) include a base station (e.g., network access node 206-1), an access point (e.g., network access node 206-2), or any other type of network node such as a network controller, radio network controller (RNC), BSC, a relay, transmission points, and the like.

The system 200 depicts different types of wireless network access nodes 206 to illustrate that the electronic device 202 can access different types of networks through different types of NANs. For example, a base station (e.g., the network access node 206-1) can provide access to a cellular telecommunications system of the network(s) 204. An access point (e.g., the network access node 206-2) is a transceiver that provides access to a computer system of the network(s) 204.

The network(s) 204 can include any combination of private, public, wired, or wireless systems such as a cellular network, a computer network, the Internet, and the like. Any data communicated over the network(s) 204 can be encrypted or unencrypted at various locations or along different portions of the networks. Examples of wireless systems include Wideband Code Division Multiple Access (WCDMA), High Speed Packet Access (HSPA), Wi-Fi, WLAN, Global System for Mobile Communications (GSM), GSM Enhanced Data Rates for Global Evolution (EDGE) Radio Access Network (GERAN), 4G, 5G or 6G WWANs, and other systems that can also benefit from exploiting the scope of this disclosure.

The system 200 includes a virtual assistant 208 that completes tasks for the electronic device. The virtual assistant 208 receives requests from the electronic device 202 to complete tasks. Each task is an objective that is completed once a series of actions have been completed. For example, the task of renewing a subscription may be associated with the actions of receiving authorization from a user to renew the subscription, accessing the user's banking information, and submitting a form related to the subscription. The actions may be sequenced by order of completion necessary to complete the task. Once the virtual assistant has completed these actions, the virtual assistant will have renewed the subscription. The virtual assistant 208 also determines a channel of the network 100 to interact with to perform an action. Each channel is a medium in the network 100 able to output information for the electronic device 202. The channels can use a plurality of communication protocols, devices, and means to submit information to a network carrier. Channels can be electronic (e.g., kiosks, web pages, servers) or physical beings/locations (e.g., external operators, network employees, physical stores). The virtual assistant may need to interact with different channels of the network 100 to complete the series of actions for a task. For instance, the virtual assistant may need to interact with an online chatbot to complete a first action for a task and a network technician to complete a second action for the task.

For each request, the virtual assistant 208 determines a set of actions associated with the respective task. The virtual assistant 208 can apply a machine-learned model to determine the actions. In some embodiments, the virtual assistant 208 can access a machine-learned model trained for the specific electronic device 202. In these instances, the virtual assistant can operate with the machine-learned model as an instance (e.g., virtual assistant instance 214) on the specific electronic device 202 or the virtual assistant 208 can operate with a machine-learned model at a server within the core network 106. In other instances, the virtual assistant uses a machine-learned model trained based on data retrieved from multiple electronic devices in the network 100 to determine the actions. Training is further described below in relation to the manager node 210.

A "model" or "machine-learned model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine-learned model can be a neural network(s) with multiple input nodes that receive the request for the task to be completed. The task can be labeled with user activity data and/or network activity data captured for the electronic device 202 and/or multiple electronic devices within the network 100. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer (an output layer), one or more nodes can produce a value classifying the input that, once the model is trained, can be used as to determine actions to take to complete the task. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

The machine-learned model can be trained on training data that describes tasks completed at electronic devices in the network. Each task can be labeled with the series of actions completed to do the task, where each action includes an indication of what channel the action was completed at, a place in an order of the series, and instructions for completing the action (e.g., what interactions to take with respect to the channel based on how the action was previously performed at the electronic device 202 or other electronic devices).

The task can be further labeled with user activity and network activity data of the particular electronic device that performed the task. The user activity data can include interactions performed at the particular electronic device, user account information (e.g., name, location of residence, subscription plan, type of particular electronic device), and the like. The network activity data can include information about how the particular electronic device 202 has interacted with other devices and components in the network 100, such as number of interactions, duration of interactions, times and dates of interactions, and the like. For example, the network activity data of an electronic device can include that the electronic device made 1,500 calls to a set of wireless devices 104 and is primarily located near base station 102-2. In embodiments where the machine-learned model is trained for a particular electronic device, the training data includes user activity data and network activity data for the particular electronic device. In other embodiments, the training data can be user activity data and network activity data for all of the electronic devices in the network 100 or a subset of electronic devices similar to the particular electronic device (e.g., similar primary locations, threshold number of interactions with a particular wireless device 104 or other component of the network 100).

The training data can be provided to the manager node 210 for training the machine-learned model. The manager node 210 can access the machine-learned model, whether stored at the electronic device 202, at the manager node 210 itself, or another location in the network 100, and train the machine-learned model on the training data. Output from the machine-learned model can be compared to the desired output that the training data is labeled with. Based on the comparison, the machine-learned model can be modified, such as by changing weights between nodes of the neural network or parameters of the functions used at each node in the neural network (e.g., applying a loss function). The manager node 210 can retrain the machine-learned model upon receiving new user activity and/or network activity data from a particular electronic device the machine-learned model is trained for, at set time intervals, and/or upon receiving new user activity and/or network data from all or a subset of electronic devices in the network 100.

The virtual assistant 208 receives indications of actions for a requested task from the machine-learned model and performs the actions. If the actions are ordered, the virtual assistant performs the actions in the specified order. For each action, the virtual assistant 208 determines whether the virtual assistant 208 can directly interact with the channel associated with the action. The virtual assistant can directly interact with channels that are accessible via electronic and/or wireless means, such as an online chat service, an external operator reached via a wireless device 104, and a kiosk. For these actions, the virtual assistant 208 corresponds with the channel to complete the action. If the virtual assistant 208 needs additional information from a user of the requesting electronic device 202 to complete the action, the virtual assistant 208 outputs a chat interface (e.g., a graphical user interface (GUI) with chat capabilities) at the requesting electronic device 202 with queries pertaining to the needed information. The virtual assistant 208 completes the action based on information received from the requesting electronic device 202 via the chat interface.

The virtual assistant 208 may be unable to directly interact with some channels associated with one or more of the actions. Examples of such channels include human operators and physical items accessible at physical locations and physical items. For example, to exchange the electronic device 202, a user of the electronic device 202 may need to take the electronic device 202 to a physical location associated with the network 100 and interact with an employee at the physical location. In instances where the virtual assistant 208 cannot directly interact with a channel, the virtual assistant can present instructions describing how a user can complete the action via a GUI at the electronic device 202. The virtual assistant 208 can receive and assess user activity and network activity data from the electronic device 202 and present multiple instructions that are determined based on the assessment via the GUI to guide the user through completing the action. The instructions can be determined by the machine-learned model based on how the same or similar tasks were performed at other electronic devices in the network 100.

In one example, the virtual assistant 208 can present instructions for a user to take the electronic device 202 to a physical location, and upon detecting that the electronic device 202 is at the physical location, present instructions for the user to enter the physical location and discuss trading in the electronic device 202 with an employee at the location. The physical location of the electronic device 202 can be determined based techniques such as Global Positioning System (GPS) data received from satellite 212, beacon data, or any other positioning information obtained from a local or remote source. The virtual assistant can store an indication of completion of each action, along with a description of the action, an identifier of the associated channel, and/or a time/date that the action was performed, in a local database or a database at the manager node 210.

The virtual assistant 208 can send an indication to the electronic device 202 that requested the task to be completed once all of the actions have been done. The indication may include information describing the task and/or actions and a time/date the task was completed (based on a time/date that the last action in the series associated with the task was completed). If the virtual assistant 208 is unable to complete one or more of the actions, the virtual assistant can send an indication to the requesting electronic device 202 and/or an external operator describing its inability to complete the actions. The virtual assistant 208 can store the indication in a local database or a database located at the manager node 210.

The system 200 includes a manager node 210 that can assist the virtual assistant 208 with completing tasks. In some embodiments, the virtual assistant 208 is located at the manager node 210. The manager node 210 can include any number of server computers communicatively coupled to the electronic device 202 via the network access nodes 206. The manager node 210 can include combinations of hardware and/or software to process condition data, perform functions, communicate over the network(s) 204, etc. For example, server computers of the manager node 210 can include a processor, memory, or storage, a transceiver, a display, an operating system and application software, and the like. Other components, hardware, and/or software included in the system 200 that are well known to persons skilled in the art are not shown or discussed herein for brevity. Moreover, although shown as being included in the network(s) 204, the manager node 210 can be located anywhere in the system 200 to implement the disclosed technology.

Virtual Assistant for Completing Omnichannel Tasks

Figure 3:
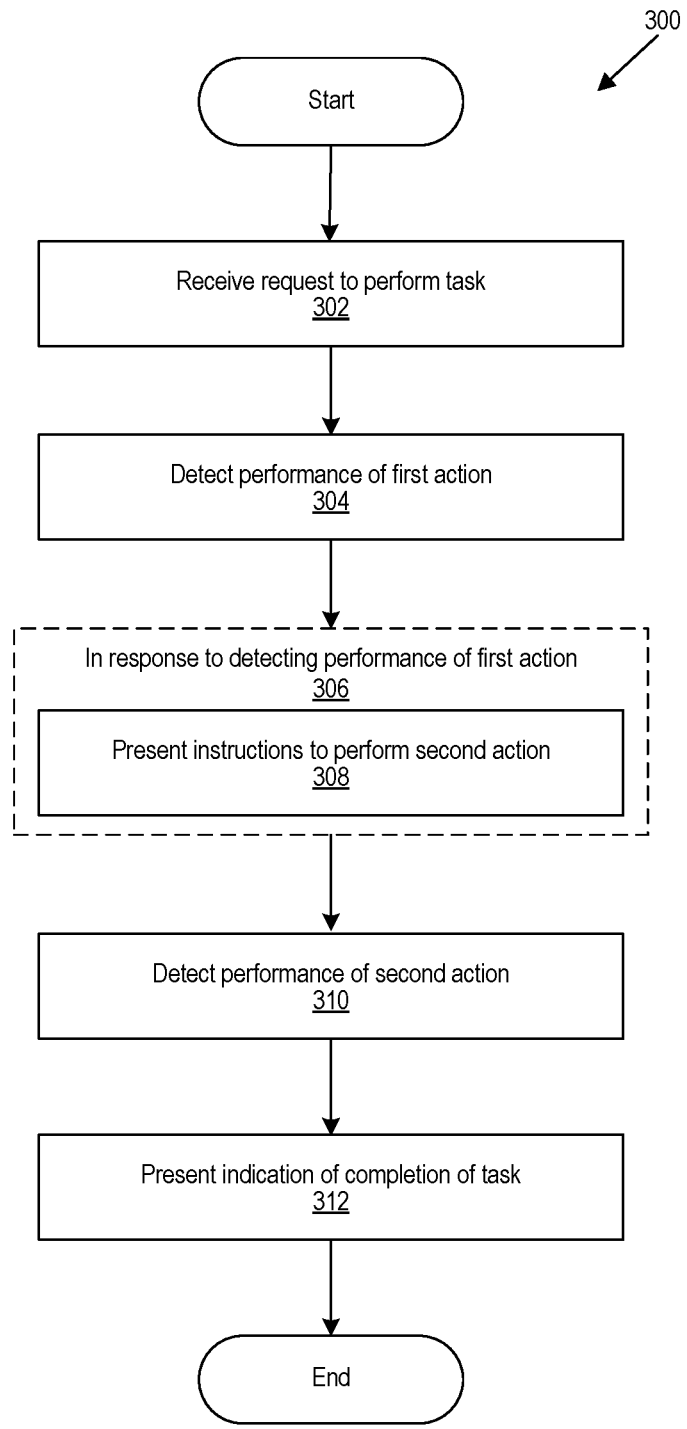
FIG. 3 is a flowchart that illustrates a process for completing a task through multiple channels.

FIG. 3 is a flowchart that illustrates a process 300 for completing a task through multiple channels connected to the network 100 (e.g., an omnichannel network). In some embodiments, the process 300 can include additional or alternative steps to those shown in FIG. 3 and/or use additional or alternative nodes in networks 100 and/or 204 compared to those described herein to perform the process 300. For instance, though the process is described as being mostly performed by the virtual assistant below, in some embodiments, the manager node 210 can perform one or more of the steps of the process.

The virtual assistant 208 receives a request to perform a task 302 associated with a handheld wireless device (or electronic device 202). The virtual assistant can be a common entry point for completing a plurality of tasks, including upgrading the handheld wireless device or another electronic device, subscribing to a new service, paying a bill, performing a configuration check, and troubleshooting a problem at the handheld wireless device. The virtual assistant 208 can receive the request directly from a GUI presented at the handheld wireless device or via the manager node 210, which may facilitate communications between the virtual assistant 208 and the handheld wireless device when the virtual assistant 208 is not located at the handheld wireless device. The virtual assistant 208 can be associated with a subscription to the network 100 such that the handheld wireless device only has access to the virtual assistant due to the associated subscription.

The virtual assistant 208 can be operable based on a model trained on user activity and network activity. The user activity data can describe one or more of user interactions with application installed at the handheld wireless device, geographical movement of the handheld wireless device, and wireless communications usage at the handheld wireless device, and the network activity can describe interactions with particular network services and location information. In some embodiments, the model is trained for the particular handheld wireless device. In other embodiments, the model is trained based on user activity and network activity of electronic devices (including the handheld electronic device) in the network 100 associated with a user of the handheld wireless device, a subset of electronic devices in the network 100 with a threshold amount of similar user activity and network activity to the activity of the handheld wireless device, and/or all user activity and network activity of electronic devices in the network 100.

The virtual assistant 208 can use the model to determine that the task can be completed by performing multiple actions through multiple channels of the network 100. The virtual assistant 208 can detect performance of a first action 304 in furtherance of completing the task associated with the handheld wireless device, where the virtual assistant 208 facilitated performance of the first action by directly communicating with a first channel in the network 100. The virtual assistant 208 can detect performance of the first action based on user activity data communicated to a network carrier of the handheld wireless device via the first channel. In some embodiments, the first action is associated with authenticating information that identifies a user associated with the virtual assistant. In these embodiments, the model can be trained particularly for the user.

In response to detecting the performance of the first action 306, the virtual assistant 208 can present instructions to perform a second action 308 via a second channel (different from the first channel) in furtherance of completing the task. The second action can be associated with network activity comprising location information of the handheld wireless device. The virtual assistant 208 can present the instructions at the GUI of the handheld wireless device or can send the instructions to the manager node 210 for presentation at the GUI. The instructions can be customized for the handheld wireless device by the model (e.g., through the model's assessment of how the second action or similar actions were performed at other devices in the network 100). The virtual assistant 208 can detect performance of the second action 310 and present an indication of the completion of the task 312 at the GUI of the handheld wireless device.

In some embodiments, virtual assistant is hosted at the manager node 210 in the network 204 and is trained to be device-independent (e.g., by being trained on training data captured at other devices in the network 204 than the handheld wireless device). In other embodiments, the virtual assistant is hosted at the handheld wireless device and is tied to a unique identifier of the handheld wireless device. In these embodiments, the model can be trained based on training data captured from the handheld wireless device.

In some embodiments, the virtual assistant 208 can receive a request to trade in a first handheld wireless device. To complete the trade-in, the virtual assistant may need to interact with multiple channels of a telecommunications network (e.g., network 100 or network 204) associated with a user of the first handheld wireless device. In response to determining that a Subscriber Identity Module (SIM) card associated with the user was moved from the first handheld wireless device to a second handheld wireless device, the virtual assistant 208 sends an alert that the SIM card was moved. The virtual assistant can send the alert to either handheld wireless device, an account associated with the user, and/or a first external operator. In response to receiving a request for troubleshooting help, the virtual assistant 208 can automatically capture a screenshot at the second handheld wireless device and send the screenshot to an external operator associated with a first channel of the telecommunications network.

The virtual assistant can perform a compatibility check on the second handheld wireless device and configure the second handheld wireless device based on configuration data (e.g., settings, user preferences, contact information) associated with the user. The virtual assistant 208 can determine that the second handheld wireless device is within a geographic range of a physical location of a second external operator associated with a second channel of the telecommunications network. In response, the virtual assistant can send an indication of the user's presence with the request to trade in the first handheld wireless device to the second external operator. The virtual assistant can display instructions of how to transfer data from the first handheld wireless device to the second handheld wireless device on a GUI of the second handheld wireless device.

Computer System

Figure 4:
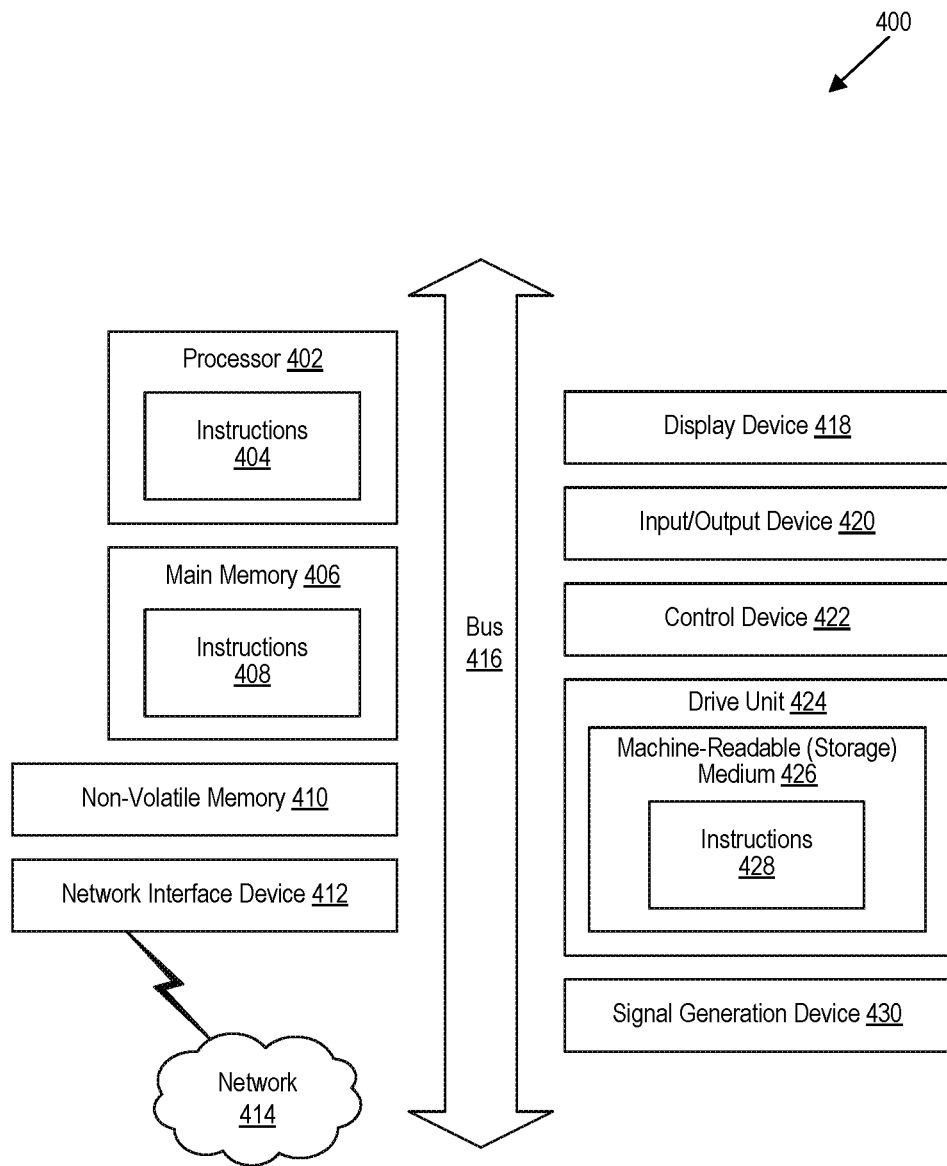
FIG. 4 is a block diagram that illustrates an example of a computer system in which at least some operations described herein can be implemented.

FIG. 4 is a block diagram that illustrates an example of a computing system 400 in which at least some operations described herein can be implemented. As shown, the computing system 400 can include: one or more processors 402, main memory 406, non-volatile memory 410, a network interface device 412, display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

The computing system 400 can take any suitable physical form. For example, the computing system 400 can share a similar architecture as that of a server computer, PC, tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computing system 400 can be an embedded computer system, a system-on-chip (SOC), a single-board computer system (SBC), or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method performed by a virtual assistant administered by a network carrier of a telecommunications network, the method comprising:
   training a machine learning model based on network activity of a handheld wireless device on the telecommunications network,
      wherein the machine learning model is a subscription service hosted by the telecommunications network, and
      wherein network activity includes communications connections of the handheld wireless device to wireless network nodes;
   receiving, at the handheld wireless device, a request to perform a task associated with the handheld wireless device,
      wherein the task is for the system to modify a service of a subscription;
      wherein completion of the task includes performing multiple actions through different communications channels;
   establishing a first communications channel between the handheld wireless devices and a network node to perform a first action required to modify the service,
      wherein, based on feedback from the machine learning model, the first communications channel is a cellular network on the telecommunications network;
   performing, using the machine learning model, the first action using the first communications channel of the telecommunications network;
   detecting, based on Global Positioning System data, a change in location and a change in network activity of the handheld wireless device,
      wherein the change in network activity includes a change in a number of connections, duration of connections, or times of connections made by the handheld wireless device;
   in response to detecting a change in location and network activity of the handheld wireless device, establishing a second communications channel to perform a second action in furtherance of completing the task,
      wherein based on feedback from the machine learning model, the second communications channel is a short-range wireless network;
   causing performance of the second action over the second communications channel;
   monitoring the second communications channel, using the machine learning model, for changes in network activity of the handheld wireless device,
   determining, using the machine learning model, performance of the second action based on the monitored changes in network activity of the handheld wireless device on the second communications channel; and
   presenting on the handheld wireless device, an indication of the completion of the task.

2. The method of claim 1, wherein the first action is associated with authenticating information that identifies a user associated with the system.

3. The method of claim 1, wherein the second action is associated with network activity comprising location information of the handheld wireless device.

4. The method of claim 1, wherein the system is trained to be device-independent.

5. The method of claim 1, wherein the system is tied to a unique identifier of the handheld wireless device.

6. The method of claim 1, wherein:
   the network activity further includes user activity comprising data that describes one or more of user interactions with at least one application installed at the handheld wireless device, geographical movement of the handheld wireless device, and wireless communications usage at the handheld wireless device; and
   the network activity further includes interactions with particular network services and location information.

7. The method of claim 1, wherein the system is a common entry point for completing a plurality of tasks, the plurality of tasks including one or more of upgrading a mobile device, subscribing to a new service, paying a bill, performing a configuration check, and troubleshooting a problem at the handheld wireless device.

8. The method of claim 1, wherein the multiple communications channels of the telecommunications network use a plurality of communication protocols, devices, and means to submit information to the network carrier.

9. At least one non-transitory computer-readable storage medium storing instructions, which, when executed by at least one data processor of a system, cause the system to perform actions comprising:
training a machine learning model based on network activity of a handheld wireless device on the telecommunications network,
wherein the machine learning model is a subscription service hosted by the telecommunications network, and
wherein network activity includes communications connections of the handheld wireless device to wireless network nodes;
receiving, at the handheld wireless device, a request to perform a task associated with the handheld wireless device,
wherein the task is for the system to modify a service of a subscription;
wherein completion of the task includes performing multiple actions through different communications channels;
establishing a first communications channel between the handheld wireless devices and a network node to perform a first action required to modify the service,
wherein, based on feedback from the machine learning model, the first communications channel is a cellular network on the telecommunications network;
performing, using the machine learning model, the first action using the first communications channel of the telecommunications network;
detecting, based on Global Positioning System data, a change in location and a change in network activity of the handheld wireless device,
wherein the change in network activity includes a change in a number of connections, duration of connections, or times of connections made by the handheld wireless device;
in response to detecting a change in location and network activity of the handheld wireless device, establishing a second communications channel to perform a second action in furtherance of completing the task,
wherein based on feedback from the machine learning model. the second communications channel is a short-range wireless network;
causing performance of the second action over the second communications channel;
monitoring the second communications channel, using the machine learning model, for changes in network activity of the handheld wireless device,
determining, using the machine learning model, performance of the second action based on the monitored changes in network activity of the handheld wireless device on the second communications channel; and
presenting on the handheld wireless device, an indication of the completion of the task.

10. The at least one non-transitory computer-readable storage medium of claim 9, wherein the first action is associated with authenticating information that identifies a user associated with the system.

11. The at least one non-transitory computer-readable storage medium of claim 9, wherein the second action is associated with network activity comprising location information of the handheld wireless device.

12. The at least one non-transitory computer-readable storage medium of claim 9, wherein the system is device-independent.

13. The at least one non-transitory computer-readable storage medium of claim 9, wherein the system is tied to a unique identifier of the handheld wireless device.

14. The at least one non-transitory computer-readable storage medium of claim 9, wherein:
the network activity further includes user activity comprising data that describes one or more of user interactions with at least one application installed at the handheld wireless device, geographical movement of the handheld wireless device, and wireless communications usage at the handheld wireless device; and
the network activity further includes interactions with particular network services and location information.

15. The at least one non-transitory computer-readable storage medium of claim 9, wherein the system is a common entry point for completing a plurality of tasks, the plurality of tasks including one or more of upgrading a mobile device, subscribing to a new service, paying a bill, performing a configuration check, and troubleshooting a problem at the handheld wireless device.

16. The at least one non-transitory computer-readable storage medium of claim 9, wherein the multiple channels of the telecommunications network use a plurality of communication protocols, devices, and means to submit information to a network carrier of the telecommunications network.

17. A system comprising:
at least one hardware processor; and
at least one non-transitory memory storing instructions, which, when executed by the at least one hardware processor, cause the system to perform actions comprising:
training a machine learning model based on network activity of a handheld wireless device on the telecommunications network,
wherein the machine learning model is a subscription service hosted by the telecommunications network, and
wherein network activity includes communications connections of the handheld wireless device to wireless network nodes;
receiving, at the handheld wireless device, a request to perform a task associated with the handheld wireless device,
wherein the task is for the system to modify a service of a subscription;
wherein completion of the task includes performing multiple actions through different communications channels;
establishing a first communications channel between the handheld wireless devices and a network node to perform a first action required to modify the service,
wherein, based on feedback from the machine learning model, the first communications channel is a cellular network on the telecommunications network;
performing, using the machine learning model, the first action using the first communications channel of the telecommunications network;
detecting, based on Global Positioning System data, a change in location and a change in network activity of the handheld wireless device,
wherein the change in network activity includes a change in a number of connections, duration of connections, or times of connections made by the handheld wireless device;

in response to detecting a change in location and network activity of the handheld wireless device, establishing a second communications channel to perform a second action in furtherance of completing the task,
  wherein based on feedback from the machine learning model, the second communications channel is a short-range wireless network;
causing performance of the second action over the second communications channel;
monitoring the second communications channel, using the machine learning model, for changes in network activity of the handheld wireless device,
determining, using the machine learning model, performance of the second action based on the monitored changes in network activity of the handheld wireless device on the second communications channel; and
presenting on the handheld wireless device, an indication of the completion of the task.

18. The system of claim 17, wherein the first action is associated with authenticating information that identifies a user associated with the system.

19. The system of claim 17, wherein the second action is associated with network activity comprising location information of the handheld wireless device.

20. The system of claim 17, wherein the system is trained to be device-independent.

* * * * *